Nov. 19, 1929. A. PENN 1,736,749
PNEUMATIC CONTROL APPARATUS
Original Filed Dec. 24, 1925   2 Sheets-Sheet 2
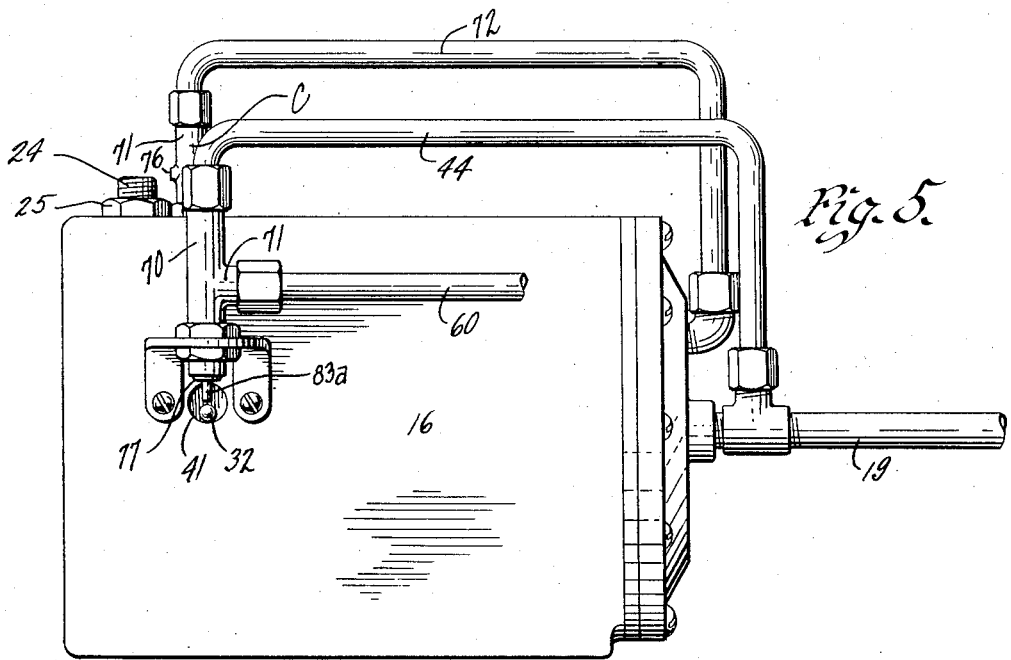

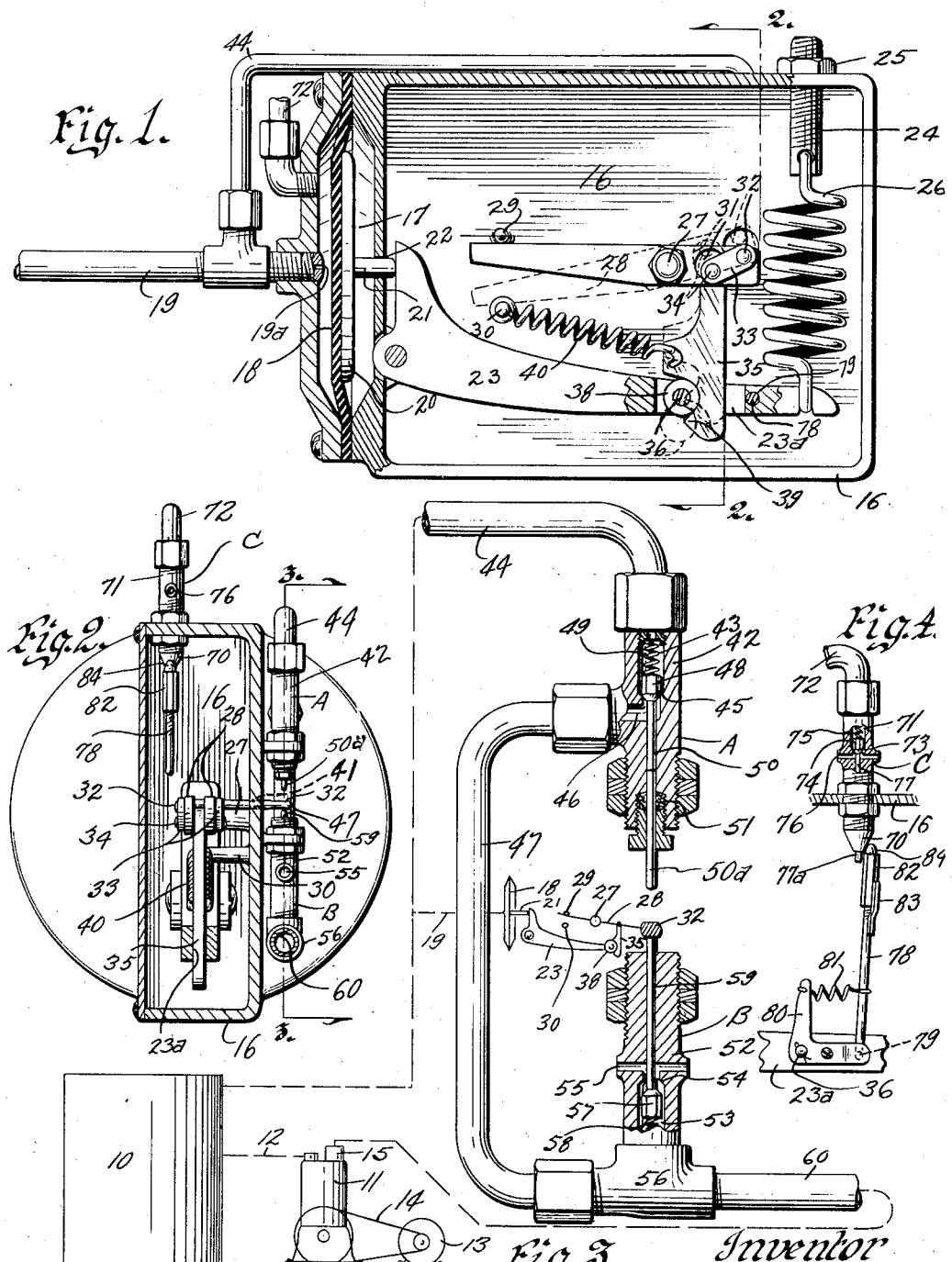

Patented Nov. 19, 1929

1,736,749

UNITED STATES PATENT OFFICE

ALBERT PENN, OF DES MOINES, IOWA, ASSIGNOR TO PENN ELECTRIC SWITCH CO. OF DES MOINES, IOWA, A CORPORATION OF IOWA

PNEUMATIC CONTROL APPARATUS

Application filed December 24, 1925, Serial No. 77,483. Renewed April 15, 1929.

My invention has to do with a pneumatic control apparatus of simple and relatively inexpensive construction, which is capable of being adapted to a great variety of applications. For the purpose of properly illustrating my invention, I have shown it in my drawings and will describe it in my specification as applied to an air compressor unloader for serving as a pilot.

I will therefore describe my invention arranged in connection with an air compressor unloader, but it is not my intention to limit myself in the patent which may be issued upon this application to such a specific application of the pneumatic control apparatus.

In addition to the application to air compressor unloaders, my pneumatic control apparatus is capable of being used in various other environments for example, to maintain pressure in a receiver within close limits for use in connection with spray painting, for the operation of air hammers, and for operation in connection with air operated heating control mechanisms.

The device can also be used in a variety of mechanisms, where for instance, a valve is to be controlled according to the pressure in a receiver for regulating the inflow of fluid into the receiver.

While I have used the term pneumatic, it is possible that the device may be used with fluids other than air.

Referring now to my apparatus as a pilot applied to an air compressor unloader, there is a type of air compressor used under circumstances where it is desirable that the compressor shall not be disconnected from the source of power which operates it.

Compressors of this type frequently have a chamber containing a piston, diaphragm or the like so connected with the compressor that when the piston is under pressure from one direction, a valve or valves will be held in such position that even though the compressor continues to be operated, it is ineffective for pumping air into the receiver.

The device of my invention herein contemplated is one which has for one of its more specific purposes, the provision of means for connecting the unloader chamber of the compressor with the compression tank in such manner and by such mechanism, that when the compression in the tank reaches a certain point, the tank will be connected with the unloader chamber of the compressor, subjecting the device therein to the pressure from the tank and thereby preventing further pressure being built up in the tank, and whereby when the pressure in the tank is reduced to a certain minimum, the mechanism of my device is operated for the shutting off of the pressure from the main tank and releasing the pressure in the unloader compartment, so that the operation of the compressor may thereupon be effective in building up pressure in the tank.

Another purpose is to provide in such a mechanism a close range control.

Another object is to provide such a structure which will not be interfered with by the sediment or dirt which does interfere with the proper operation of most other unloader pilots.

An additional purpose is to provide a device of the kind mentioned adapted upon each operation to move an operative member positively through a certain range, so that the compressor valves are positively and quickly acted upon. This eliminates the possibility of the compressor valves ever getting into balanced position where they "chatter." By the quick action of the device, the constant leakage common to most compressor unloader pilots is done away with.

With these and other objects in view, my invention consists in the construction, arrangement and combination of the various parts of my pneumatic control apparatus, whereby the objects contemplated are attained, as hereinafter more fully set forth, pointed out in my claim, and illustrated in the accompanying drawings, in which:

Figure 1 shows a detail, sectional view of part of a pneumatic control apparatus embodying my invention.

Figure 2 is a detail, sectional view taken on the line 2—2 of Figure 1.

Figure 3 is a detail, sectional view of part of the mechanism taken on the line 3—3 of Figure 2, the compressor tank and connections being shown in diagram.

Figure 4 is a detail, sectional view illustrating part of the close range mechanism.

Figure 5 shows a side elevation of the mechanism embodying a slightly modified form of my device.

Figure 6 shows a vertical, sectional view through the valve mechanism of the device shown in Figure 5.

Figure 7 shows a similar view of the valves in a different position; and

Figure 8 is a transverse, sectional view taken on the line 8—8 of Figure 6.

In the accompanying drawings, I have used the reference numeral 10 to indicate generally a pressure tank and the numeral 11 to indicate a compressor connected with the pressure tank by means of the pipe 12 shown in diagram.

The compressor is operated from a motor 13 or the like through the medium of suitable operating mechanism 14 shown here for purposes of illustration in the form of a belt and pulleys.

At the top of the compressor 11 is the unloader compartment 15 containing the piston, diaphragm or other pressure actuated member, not shown, but of known structure, which when subjected to pressure operates to unload the compressor, or in other words, causes it to idle without building up further pressure in the receiver, even though it continues to run.

In order to connect the unloader on the compressor with the pressure tank 10 in such a way that the unloader compartment will be subjected to the pressure in the tank 10, when such pressure reaches a certain maximum, and will be relieved from such pressure when the tank pressure reaches a certain minimum, there is provided the device which is the subject of the present invention.

My invention comprises a suitable casing 16, which encloses and supports parts of the mechanism of my device and supports other parts.

At one end of the casing 16 is a diaphragm chamber or compartment 17 in which is mounted a suitable diaphragm 18.

A pipe 19 communicates with the pressure tank 10 and with the diaphragm chamber 17 on one side of the diaphragm 18.

The end of the pipe 19 which discharges into the diaphragm chamber is provided with a choker in the form of a reduced passage 19ª, which may be embodied in various forms.

On the opposite side of the diaphragm 18 from the pipe 19 is a head or the like 20 from which a pin 21 extends through the wall of the diaphragm chamber through the hole 22.

Pivotally mounted within the casing 16 is a bell crank lever 23, one arm of which stands adjacent to the pin 21. Mounted in the wall of the casing 16 is an adjustable screw bolt 24 on one end of which is a nut 25 for adjusting purposes.

A coil spring 26 connects the screw bolt 24 with the other arm of the bell crank lever 23 as illustrated in Figure 1 for tending to yieldingly press the bell crank lever against the diaphragm pin 21.

Pivoted on the wall of the casing 16 on the interior thereof as at 27 is a lever 28 one end of which is arranged to travel between stop pins 29 and 30 supported on the wall of the casing 16. The other end of the lever 28 is bifurcated and its arms have the relatively large registering openings 31.

Pivoted to said arms of the lever 28 as at 32 are links 33. A pin 34 extends through the links 33 and through the holes 31 and is pivoted to the upper end of an arm 35 received between the bifurcated arms of the lever 28. The lever 23 is bifurcated and has the spaced arms 23ª, between which extends the pin 36 on which is a roller 38. The arm 35 extends between the arms 23ª of the lever 23 and is provided with a V-shaped portion 39 arranged adjacent to the roller 38 to coact therewith.

A coil spring 40 is connected with the arm 35 and the stop pin 30. In the wall of the casing 16 is an opening 41 through which the pivot pin 32 projects.

Supported at the side of the casing 16 in the form of the invention illustrated in Figures 2 and 3 is a valve structure indicated generally by the reference character A and another valve structure indicated generally by the reference character B. The valve structure A has a valve body or casing 42 in which is a chamber 43 which communicates by means of a pipe 44 with the pipe 19.

At the lower part of the chamber 43, as shown, is a valve seat 45, and below this is a passage 46 communicating with a pipe 47.

Seated in the passage 43 and arranged to coact with the seat 45 is a valve 48, which is normally held seated by means of a spring 49 and by air pressure. The valve 48 has a stem 50 slidably mounted in the lower part of the casing 42 and aligned with a plunger or pin 50ª extending through the end of the casing 42 and through a stuffing box or the like 51 and projecting from the valve casing 42 as shown in Figure 3.

The valve B comprises a casing 52 having in its lower part a passage or the like 53 formed with a valve seat 54. The passage 53 communicates with a passage 55 open to the air.

Connected with the pipe 47 is a T fitting 56 connected with the lower part of the valve casing 52 and communicating with the passage 53.

A valve 57 is received in the passage 53 to coact with the seat 54 and is normally held seated by means of a spring 58 and by air pressure. The stem 59 of the valve 57 projects upwardly through the body of the valve casing 52 in direct alignment with the plunger 50ª.

The projecting end of the pivot pin 32 is arranged to travel between the ends of the plunger 50ª and stem 59, for alternately opening the valves.

The T 56 communicates by means of the pipe 60 with the unloader 15 of the compressor 11.

The construction of my improved pneumatic control apparatus will be clearer after the description of the operation of the device, which will now be given.

In the operation of this device, it will be understood that when the parts of the compressor 11 are in their normal position, that is, when there is no pressure in the chamber 15, the compressor will be operated from the motor 13 or other power source for pumping air through the pipe 12 into the pressure tank 10.

When the air in the pressure tank 10 reaches a certain degree of compression, the pressure against the diaphragm 18 will actuate the bell crank lever 23, moving it from its position shown in Figure 1, until the roller 38 travels downwardly to a point approaching the apex of the V-shaped member 39. The degree of pressure required to so actuate the the bell crank lever 23 depends upon the strength and adjustment of the spring 26.

When the center of the roller approaches the point of the V 39, then the arrangement of the spring 40 and the angle of the links 33 are such that the arm 35 is rapidly moved upwardly entirely eliminating neutral or central position, so that the lower beveled face of the V 39 will thereupon coact with the roller 38, and the spring 40 will cause the beveled face of the V to travel on the roller for effecting the further upward movement of the arm 35.

The action is that described in the Ralph Penn Patent, No. 1,520,258, issued December 23, 1924, assigned in part to the present applicant.

The effect of such an upward movement of the arm 35 will be to swing the left-hand end of the links 33 upwardly. The first part of the upward swinging movement of the links 33 will have no effect upon the lever 28 owing to the travel of the pin 34 in the holes 31. When, however, the pin 34 reaches the upper part of the openings 31 and engages the lever 28, the right-hand end of that lever will be swung upwardly carrying with it the pin 32.

The pin 32 will then move from its position shown in Figures 2 and 3 upwardly for engaging the plunger stem 50ª with a quick movement. The stem 50 is thereupon moved upwardly carrying with it the valve 48 against the pressure of the spring 49 and the pressure in the line 44 for unseating the valve 48.

When the valve 48 is unseated, compressed air will pass from the tank 10 through the pipes 19 and 44 to the passage 43 and around the valve 48 to the passage 46 and the pipe 47 and thence through the T 56 and pipe 60 to the unloader 15.

The interior of the unloader 15 will then be subjected to the pressure that exists in the tank 10.

So long as the pressure is maintained in the chamber 15, the compressor 11 is ineffective to increase pressure in the tank 10, although the compressor remains operatively connected with the motor or the like 13 and continues to run.

It will be understood that during the foregoing operation, the valve 57 is closed by the spring 58 and the air in the line when the pin 32 leaves the plunger 59.

When the pressure in the tank 10 goes down below a certain limit, due to any cause, the tension of the spring 26 is such that the right-hand end of the bell crank lever 23 is raised until the roller 38 clears the point of the V-shaped portion 39.

Thereupon, the arm 35 will be pulled against the roller 36, so that the upper beveled face of the V-shaped portion 39 will travel down the roller 38 for moving the arm 35 downwardly, thereby carrying downwardly the links 33 with a quick movement, which is very quickly transmitted to the lever 28 and then to the pin 32.

When the pin 32 moves away from the plunger 50ª, the spring 49 and the pressure will cause the valve 48 to be seated.

The pin 32 then travels downwardly far enough to engage the stem 59 and unseat the valve 57, whereupon the air pressure in the unloader and the pipe 60 is released, and the compressed air can flow out through the opening or passage 55. Thereupon the pressure actuated member in the unloader 15 will no longer be effective to render the compressor 11 inoperative, and as the compressor 11 is worked, it will pump air into the tank 10.

It should perhaps be said that the compressor 11 with its unloader 15 is an ordinary and commonly known structure.

It will thus be seen that with this device, there is provided a simple and effective means for automatically subjecting the unloader chamber 15 to the pressure in the tank 10 when that pressure is above a certain predetermined point and for relieving the unloader chamber from such pressure when the pressure gets down to a certain point.

This pilot delivers tank pressure to the unloading device at some predetermined maximum pressure. The compressor is then unloaded and will run idle until pressure in the tank has dropped a few pounds when the pilot reverses its action, shutting off tank pressure and releasing all pressure in the unloader. The compressor will then start to pump air again and build up the tank pressure. This cycle of operations is repeated as tank pressure rises and falls.

It is of considerable importance in some pressure unloaders that the pilot should act within a very close range. That is to say, it is desirable that a very moderate variation in the pressure in the tank should effect the operation of the pilot.

In order to meet such conditions and reduce the range of the pilot herein described and to make it very responsive to slight changes in pressure in the tank and to provide for ready adjustment for varying such range, I have provided the following means:

A valve casing C is mounted in the top wall of the casing 16 as shown for instance in Figure 4.

The lower end of the casing C within the casing 16 has a beveled side as at 70. In the casing C is a passage 71, which communicates with a pipe 72 extending to and connected with the interior of the diaphragm chamber on the same side thereof, as the pipe 19, as indicated in Figure 1.

In the passage 71 is a valve seat 73. A valve 74 coacts with the seat 73 and is normally held seated by a spring 75 and air pressure.

A vent passage 76 communicates with the passage 71 as shown in Figure 4. The valve 74 has a stem 77 extending into the lower part of the casing C in alignment with a plunger pin 77$^a$ slidably mounted in and normally projecting beyond the beveled portion 70 of the casing C.

A rod 78 has one end bent at right angles and extended through a hole 79 shown in dotted lines in Figure 4, in the bell crank lever 23$^a$.

An angle 80 is secured to one of the arms 23$^a$ and has one end overlying the rod 78 to hold the end thereof in the hole 79.

A spring 81 is connected with the other arm of the angle 80 and to the rod 78 for yieldingly holding the adjustable sleeve 82 on the upper end of the rod 78 adjacent to the beveled face 70 of the casing C.

The sleeve 82 is screwed onto the rod 78 as shown in Figure 4 for purposes of assembly and adjustment.

The outer surface of the sleeve 82 is preferably hexagonal.

A spring 83 is secured to the rod 78 and bears against the sleeve 82 for preventing accidental rotation of the sleeve.

The upper end of the rod 78 as at 84 projects slightly beyond the sleeve 82 and is rounded. The upper end of the sleeve 82 thus forms a shoulder.

The operation of the device shown in Figure 4 in reducing the range of the pilot will now be explained.

When the pressure in the tank is raised and the lever 23 is in its lowered position, the shoulder on the sleeve 82 stands below the pin 77$^a$.

When the pressure in the tank goes down and permits the spring 26 to move the right-hand end of the bell crank lever 23 upwardly, the upward movement of the right-hand end of the bell crank lever 23 causes the shoulder formed by the upper end of the sleeve 82 to engage the downwardly projecting end of the pin 77$^a$ for opening the valve 74. This movement of the valve 74 permits air to be discharged from the left-hand side of the diaphragm chamber through the pipe 72, the passage 71 and the passage 76 for quickly reducing the pressure in the diaphragm chamber.

Owing to the choke device 19$^a$ with its reduced opening, the air in the tank 10 can not pass into the diaphragm chamber as fast as the air in the diaphragm chamber escapes.

The importance of the device shown in Figure 4 is considerable, because it greatly reduces what would otherwise be the range between the maximum and minimum pressures under which the pilot would operate.

The close range device is also of importance in that it is adjustable through adjustment of the sleeve 82 for regulating the range as may be desired.

The specific mechanism shown in Figure 4 is the subject of another application filed by me, to-wit, Serial No. 71,500, filed November 25, 1925.

In Figures 5, 6, 7 and 8, I have shown a modified and perhaps the preferred form of my device.

This form of the embodiment of the invention is the same in general principle as that already described and is the same in structure, except that instead of using the valve casings A and B, the fitting 56 and the connecting pipe 19 together with the valves shown in Figure 3, I have provided a different form of mechanism.

In the form of the device shown in Figures 5, 6, 7 and 8, the pipe 44 is connected with a T 70, the branch of which is connected with a pipe 60, as shown in Figure 5. The branch, I have indicated at 71.

In the body of the T 70 on opposite sides of the passage into the branch 71 are valve seats 72 and 73 respectively. A valve 74 coacts with the valve seat 72 and controls the flow of fluid from the pipe 44 to the branch 71 and pipe 60 or to the other end of the T 70 as the case may be. The other end of the T 70 is open. A spring 75 normally holds the valve 74 seated.

Below the valve seat 73 is a valve chamber 76 in which is mounted a valve 77. The valves 74 and 77 have adjacent stems 78 and 79. The valves 74 and 77 are of such shape, for instance hexagonal, so that they will be properly guided in their chambers and yet allow free passage of air.

The valve 77 has a recess in its lower end, as indicated at 80, to receive a spring 81 much stronger than the spring 75. A plug 82 is screwed into the lower end of the recess 80. A plunger 83 is received in the recess 80 and has its lower end 83$^a$ projecting slidably through the plug 82 and resting upon the projecting end of the pivot pin 32.

On the plunger 83 just above the plug 82 is a collar 84.

The operation of the form of the device shown in Figures 5, 6 and 7 is substantially the same as that already described.

When the pressure in the receiver is down, the spring 26 pulls the long end of the lever 23 up, which as hereinbefore explained, causes the pivot pin 32 to stand in its lower position, whereupon the valves 74 and 77 will stand in their position shown in Figure 6.

When the pressure in the receiver goes up enough to overcome the action of the spring 26 and the long end of the lever 23 is forced downwardly for actuating the trip mechanism for causing it to raise the pivot pin 32, that pin will engage the end 83$^a$ of the plunger 83 for thus through the interposition of the spring 81 closing the valve 77.

The stem 79 engages the stem 78 and since the spring 81 is much stronger than the spring 75, the valve 74 is thus opened, whereupon air will pass through the pipe 44 and the T 70 past the valve 74 through the branch 71 and pipe 60 to the chamber 15. The operation is otherwise the same as has already been described.

Changes may be made in the details of the structure and arrangement of the parts of this device without departing from the real spirit and purpose of my invention, and it is my intention to cover by my claim, any such changes in structure or use of equivalents, as may be reasonably included within their scope.

I claim as my invention:

In a device of the class described, a pressure tank, a receptacle, a pipe connected with the pressure tank, a pipe connected with the receptacle, a valve for controlling flow of fluid between said pipes, and means subject to pressure in the first pipe for automatically actuating said valve to fully opened position when the pressure in the first pipe reaches a certain predetermined maximum and for actuating said valve to fully closed position when the pressure reaches a certain predetermined minimum, said means being adjustable for varying such predetermined pressures and additional means for varying the range between said pressures.

Des Moines, Iowa, October 16, 1925.

ALBERT PENN.